May 24, 1966  A. E. SCHELLSCHMIDT  3,252,748
PROJECTOR
Filed July 15, 1963  4 Sheets-Sheet 1
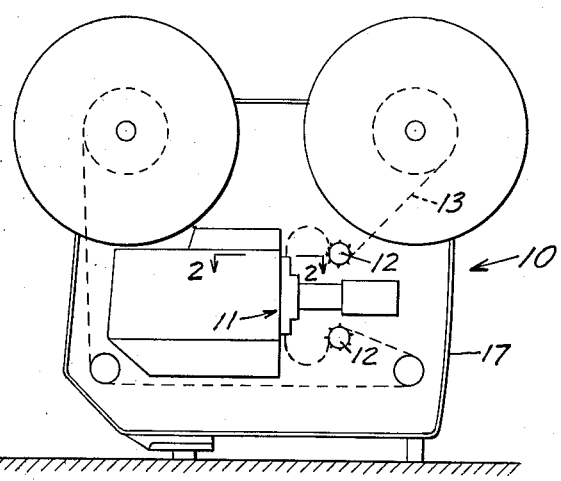
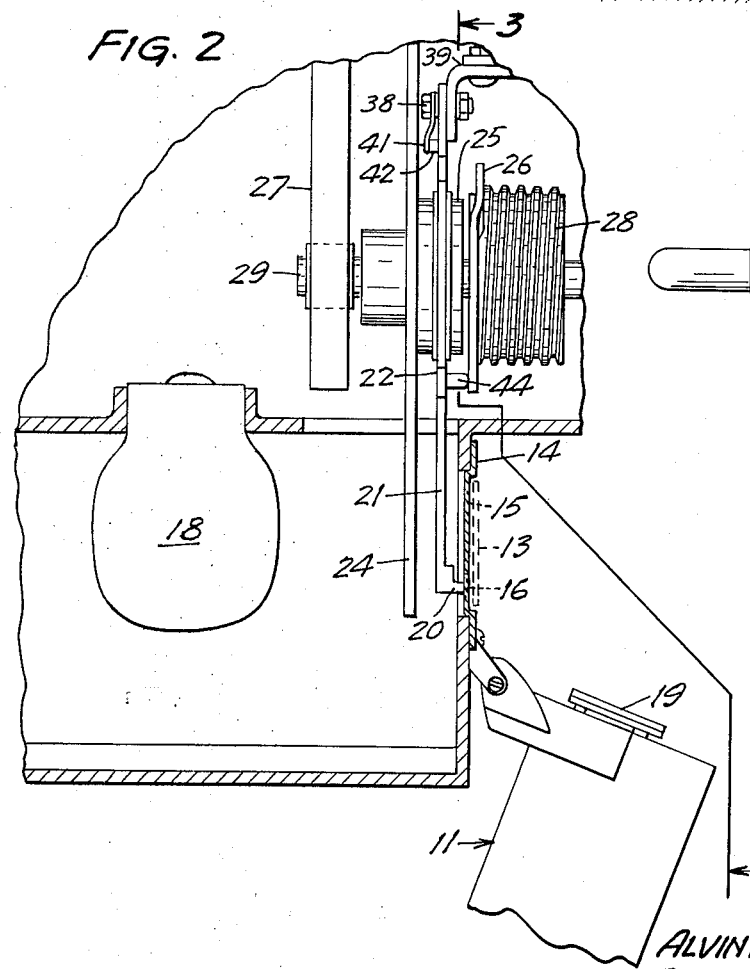
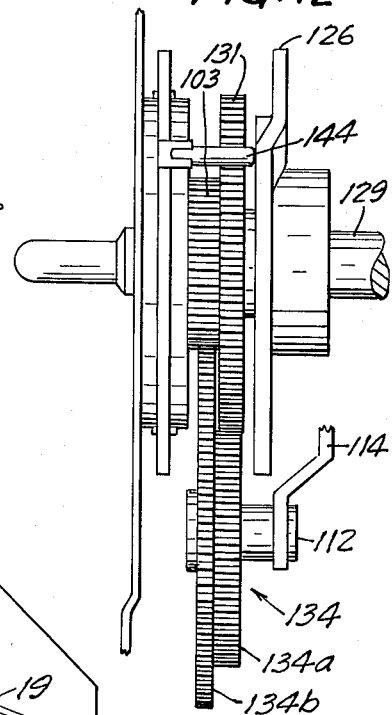
INVENTOR
ALVIN E. SCHELLSCHMIDT
BY
Carpenter, Abbott, Coulter & Kinney
ATTORNEYS May 24, 1966  A. E. SCHELLSCHMIDT  3,252,748
PROJECTOR
Filed July 15, 1963  4 Sheets-Sheet 2
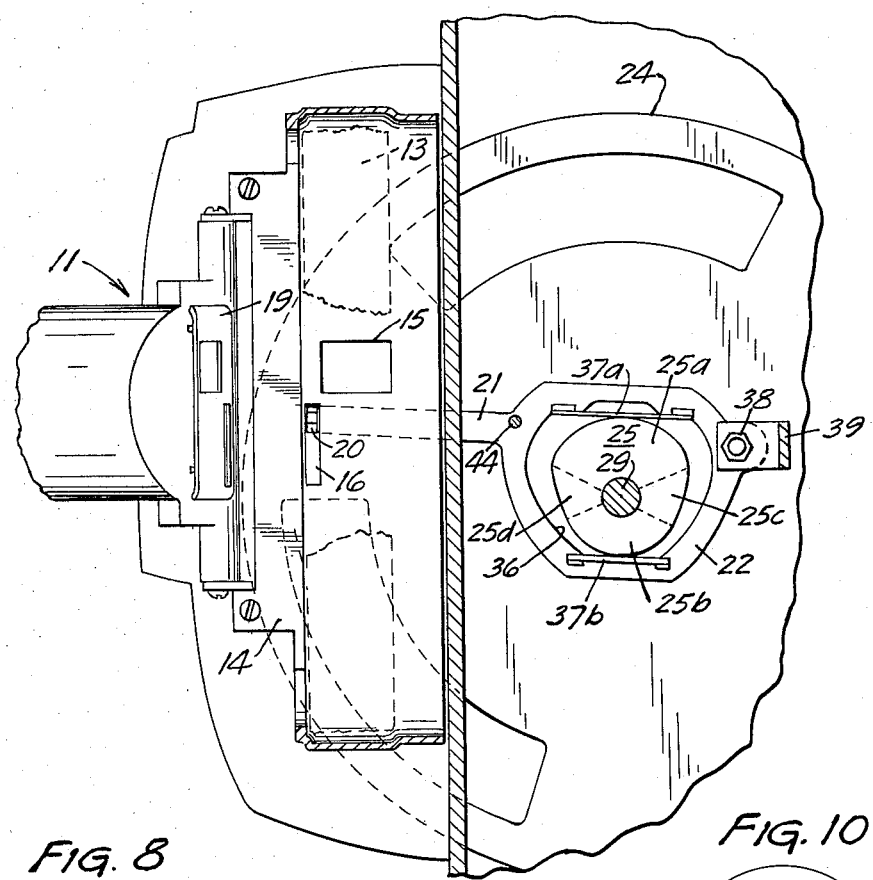
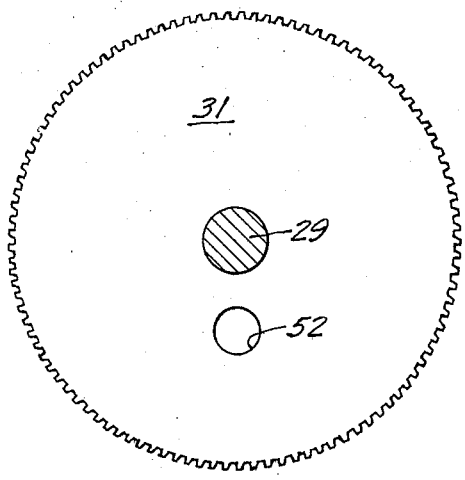
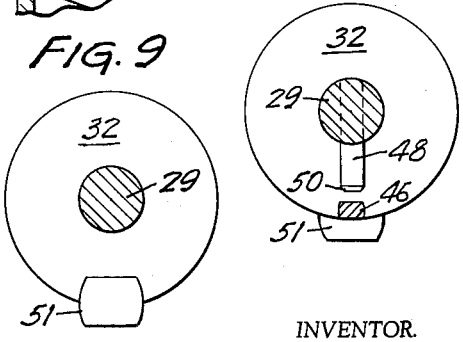
INVENTOR.
ALVIN E. SCHELLSCHMIDT
BY
Carpenter, Abbott, Coulter & Kinney
ATTORNEYS INVENTOR.
ALVIN E. SCHELLSCHMIDT
BY
Carpenter, Abbott, Coulter & Kinney
ATTORNEYS May 24, 1966  A. E. SCHELLSCHMIDT  3,252,748
PROJECTOR
Filed July 15, 1963  4 Sheets-Sheet 4
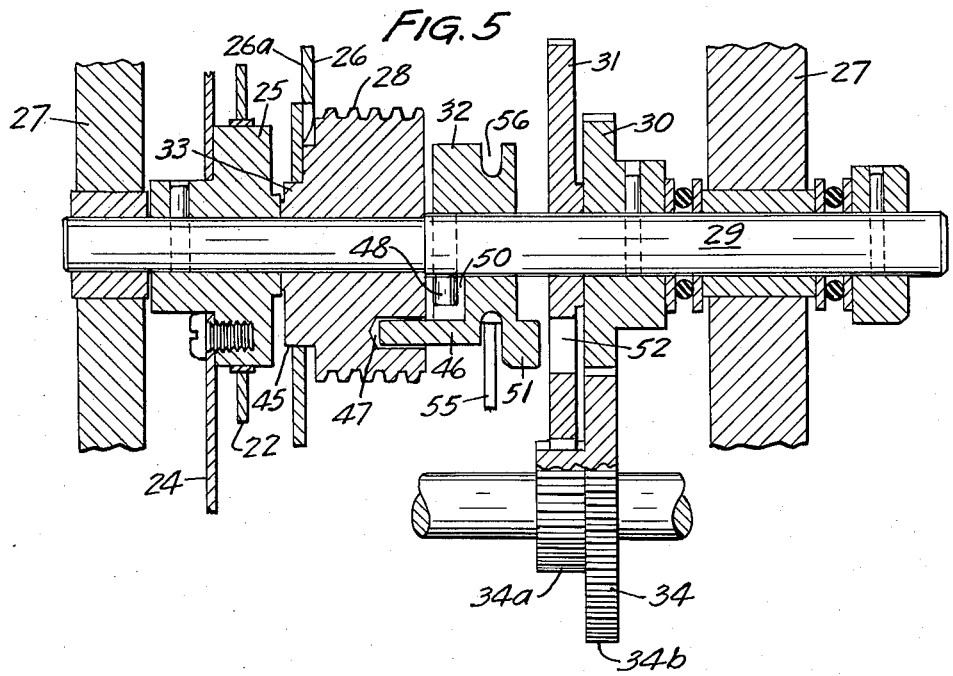
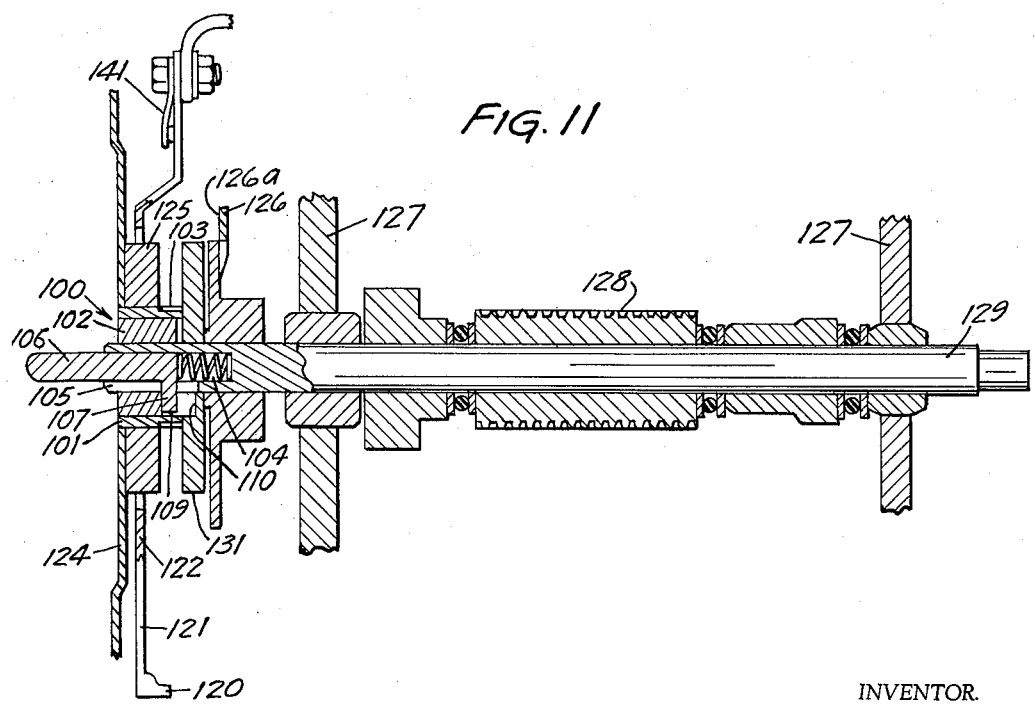
INVENTOR.
ALVIN E. SCHELLSCHMIDT
BY
Carpenter, Abbott, Coulter & Kinney
ATTORNEYS United States Patent Office 3,252,748
Patented May 24, 1966

3,252,748
PROJECTOR
Alvin E. Schellschmidt, Homewood, Ill., assignor to Minnesota Mining and Manufacturing Company, St. Paul, Minn., a corporation of Delaware
Filed July 15, 1963, Ser. No. 295,109
4 Claims. (Cl. 352—180)

The subject of this invention is film advancing and film projection apparatus, specifically as found in motion picture projectors. The invention is primarily directed toward improvement of such apparatus to permit viewing film at low rates of frames/second.

Ordinary motion picture projectors have a minimum frame/second projection rate below which the picture projected is of inferior quality because subject to the phenomenon of "flicker." In the intermittent advancement of film through a projector, a shutter blade blacks out the screen during the time the film moves, but the blackout is not noticed at or above 16 frames/second (the usual amateur speed) because the viewer's vision of the projected image continues for a short time interval after the screen is darkened. In conventional projectors, as the operation of the film advance mechanism is slowed, the shutter speed also is slowed and the blackout period lengthened. When using such conventional projectors at rates much below 16 frames/second, the viewer's perception of the image fades before a new picture is projected, causing the viewer to be disturbed by flicker.

To achieve slow motion effects using ordinary projectors, film is generally exposed at a fast rate, 48 or 64 frames/second being common, so that when projected at 16 frames/second the action will appear to occur more slowly. This may entail greater use of film than the camera fan would prefer. Furthermore, he has in the past been obliged to decide before taking the picture whether he wished to be able to project at slow motion.

A projector using the present invention can display film at very low frame/second rates without flicker. This capability is added to the normal projection capability in such a way that the film projection may be switched between regular and slow speeds. With the novel projector, film exposed without the intention of later showing it in slow motion (and therefore exposed at 16 frames/second) may now be shown in slow motion if desired. Various studies of activity, such as work motion studies, scientific analyses, or athletic investigations, may be accomplished without the large expenditure of film which has heretofore been required. Still scenes may be exposed for very brief periods, using only a fraction of the film customarily used for this purpose, and the duration of projection extended by switching the projector to slow speed when the still scene appears.

The projector achieves slow motion projection as described with a film advancing mechanism that intermittently advances film in conventional, uniform start-stop cycles, but which includes means for interrupting in a regular pattern the intermittent film advancement during the stop portion of predetermined cycles. Thus, the time period that the film is stopped and an image projected on the screen is lengthened while the time period of film movement, during which the screen is darkened, remains the same.

A motion picture projector embodying the present invention will conventionally have a motor, a lamp providing a projection beam, and means for guiding film through the projection beam, including an aperture plate to frame the projected image. A film engaging finger periodically engages the film and advances it frame by frame in front of the projection aperture. Two motor driven means, to a partial extent controlled together impart motion to the finger, one means reciprocating the finger along the direction of film movement to provide film advancing movement, and the other shuttling the finger into and out of engagement with the film. The projector incorporates means for interrupting the shuttling movement of the finger in a predetermined pattern to provide at least one rate of slower film advancement, usually $1/n$th the conventional rate, $n$ being an integer. This slower rate permits slow motion viewing, but the viewer is not subjected to the annoyance of flicker associated with previous ways of slow speed projection of film, since the shutter rotates at the normal speed and the film, when advanced, moves at normal speed.

Such a motion picture projector is illustrated in the drawings wherein:

FIGURE 1 is a side elevation of a projector which embodies the invention;

FIGURE 2 is an enlarged fragmentary section along the lines 2—2 of FIGURE 1 with the film gate assembly swung open;

FIGURE 3 is a fragmentary section along the lines 3—3 of FIGURE 2;

FIGURE 5 is a central section of part of the mechanism shown in FIGURE 4;

FIGURES 6–10 are sections taken along the lines 6—6 through 10—10 in FIGURE 4;

FIGURE 11 is a horizontal central section through a portion of a film advancing mechanism of different design; and FIGURE 12 is a side elevation of part of the mechanism shown in FIGURE 11.

Figure 4:
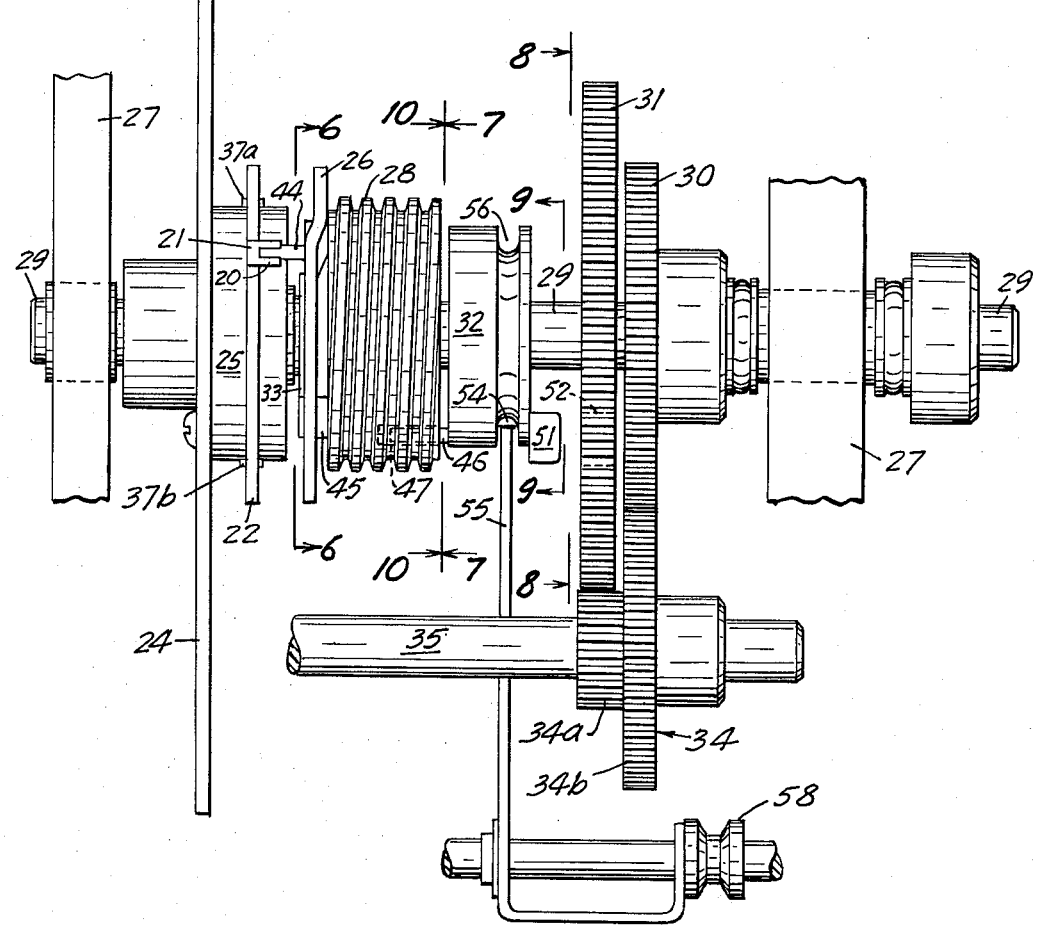
FIGURE 4 is an enlarged side elevation of the main part of the film advancing mechanism of the projector, the shaft being rotated a quarter turn from its position in FIGURES 2 and 3.

The improved film advance mechanism of this invention will be described with reference to a projector 10, shown in FIGURE 1, which has a film gate assembly 11 and drive sprockets 12. The path of a film 13 is indicated in phantom line in FIGURE 1. The film gate 11 swings open to reveal an aperture plate 14 which, as shown in FIGURES 2 and 3, is provided with a projection aperture 15 and film moving finger slot or aperture 16. A lamp 18 inside the projector housing projects light through the aperture 15. Film is held against the aperture plate 14 by a pressure plate 19 attached to the back of the film gate door and suitably apertured to coincide with apertures 15 and 16 in the aperture plate.

The drive sprockets 12 feed film to the film gate assembly 11, where a film engaging finger 20, extending through the aperture 16, engages in the sprocket holes in the film to advance the film frame by frame in front of the projection aperture 15. The film moving finger 20 projects from an extending arm 21 of a shuttle plate 22. Two cams 25 and 26 and associated mechanism described below cooperate to move the plate 22 and attached finger 20 in film advancing movement.

A shutter 24, the cams 25 and 26, and a worm 28 which powers the drive sprockets 12 are all mounted in the projector for rotation about main shaft 29 and operate in timed relation to one another. The shaft turns in bearings fixed in supports 27 attached to the projector housing, as shown in FIGURES 4 and 5. A drive gear 30 is fixed to the shaft 29 and turns it, while a floater gear 31 independently rotates on the shaft. A speed range shifter sleeve 32, movable along the axis of the shaft, also may rotate independently of the shaft, as does the worm 28, which carries the cam 26 on a cylindrical extension 33. The shutter 24 is attached to cam 25 which in turn is fixed to the shaft. A compound gear 34, fixed on a shaft 35 driven by the projector motor, and including a small gear 34a and large gear 34b, turns the drive gear 30 and floater gear 31.

The shuttle plate 22 follows cams 25 and 26, cooperating with cam 25 to reciprocate the finger 20 up and down in the slot 16 (see FIGURE 3), or in other words, along the line of sprocket holes in film 13 lying against the aperture plate, and with cam 26 to move the finger into and out of the sprocket holes. The shuttle plate, pivoted by screw and nut 38 to an L-shaped bracket 39 attached to the projector housing, has an interior recess 36, as seen in FIGURE 3, in which the cam 25, eccentrically mounted on shaft 29, is disposed. Thin plates 37a and 37b are fitted across the top and bottom of the recess 36 and form cam engaging surfaces. The cam 25 is a constant-diameter cam with a peripheral camming surface that is constantly engaged with both thin plates 37a and 37b throughout the cam's period of rotation. The camming surface includes opposed sections 25a and 25b (see dotted lines in FIGURE 3) having different constant radii of curvature about the eccentric point of rotation and a second pair of opposed sections 25c and 25d of varying radii of curvature.

With the constant radius section 25a against thin plate 37a, the shuttle plate rides steadily at its peak height. At the end of travel of section 25a on plate 37a, when the shaft 29 is turning in its forward frame advancing direction, the shuttle 22 and finger 20 are permitted to move downwardly by the camming surface section 25c until section 25b contacts plate 37a and the shuttle rides at its lowest height. Shutter 24, which turns at the same rate as cam 25, blacks out the screen during the finger's downward, frame advancing movement.

Figure 6:
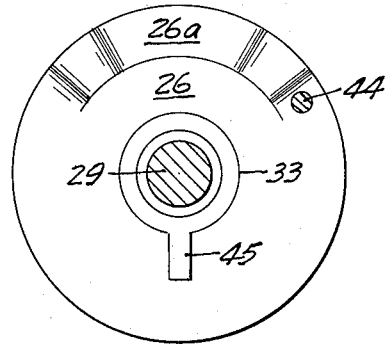
Figure 7:
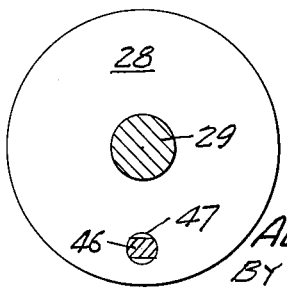

Cam 26, rotating in a plane substantially parallel to shuttle plate 22 as seen in FIGURE 2, moves the shuttle plate, through a pin 44 attached to the plate and extending between the plate and the cam 26, back and forth along the cam 25 on shaft 29 to provide movement of the finger 20 into and out of engagement with the film sprocket holes. A leaf spring 41, pressing against a boss 42 on the back of the shuttle plate 22, forces the plate toward the cam 26, and holds the tip of pin 44 against the radial surface of the cam. The plate is permitted to move forward when an arcuate, depressed, flat surface section 26a of the cam (see FIGURE 6) moves beneath the pin 44, finger 20 moving through slot 16 in the aperture plate 14 at the same time.

Cam 26 is mounted on a cylindrical extension 33 of worm 28 and is keyed at 45 (see FIGURE 6) for rotation with the worm. As shown in FIGURE 5, the worm is driven in turn with shifter sleeve 32 by a projecting pin 46 on the shifter positioned in a bore 47 in the worm that is parallel to and radially spaced from the shaft 29. The shifter has two operative positions along the axis of shaft 29, being driven in one position by the shaft and in a second by the floater gear 31. A pin 48, fastened in a radially extending bore in the shaft 29 as seen in FIGURES 5 and 10, is adapted to slide within an interior, axially and radially extending recess 50 in the shifter 32, in one angular and axial position of the shifter, to turn the shifter as the shaft rotates. In its second position, out of engagement with the pin 48, the shifter 32 is connected with the gear 31 by means of a projecting lug 51 on the shifter which rides in a circular recess 52 spaced radially from the shaft 29 in the gear 31. The shifter is moved between the two positions by a bar 54 fitted in a groove 56 in the shifter and carried on a rod 55 that is attached to a slide 58 moved, through means not shown, by a control on the exterior of the projector.

In both positions of the shifter 32 the pin 46 remains within the bore 47 in the worm 28. Thus the worm and attached cam 26 rotate either at the angular velocity of the shaft 29 or the floater gear 31 depending on the position of the shifter. The shifter sleeves' dimensions and the location of the radial pin 48 and floater gear 31 are precisely established, and the shifter is turned by the gear 28 immediately when rotation with the shaft ends.

At both its regular and fractional rate the cam 26 is rotated in sequence with cam 25 so that the cams cooperatively move the shuttle plate through a complete frame moving cycle. Inasmuch as the inward movement of the plate 22 and finger 20 must coincide with the beginning of their downward movement to advance film forward in the projector described, and thus must occur no more than once for each rotation of the shaft 29, the rate of rotation of cam 26 after slowing must be $1/n$th the rate for the shaft 29, $n$ being an integer. The desired ratio is established through the relation between the floater gear 31 and drive gear 30 and the gears 34a and 34b of the compound gear 34.

Changing the rate of rotation of the cam 26 changes the rate of frame advancement, since, though the finger continues to reciprocate up and down at the same rate, the effective film advancing action is controlled by the in-out shuttling. Worm 28, turning at the same rate as the cam 26, propels the drive sprockets 12, through gear trains not shown, to feed film to the film gate at a rate commensurate with the frame advancement rate. With the shuttle plate 22 continuing to reciprocate up and down at a constant rate, the speed of the downward movement, or the time it takes to move one frame forward once movement begins, remains the same. The shutter 24 also rotates at a constant speed so that the blackouts remain constant in frequency and length and thus visually undetectable, even though occuring several times during the period that one frame is projected on the screen.

Various step-down ratios might be used. In addition, different camming arrangements might change the sequences of movement or the relative speeds of the shaft and floater gear. Projectors using a ratio 3:1, with 72 teeth on the floater gear 31 and 24 on the small gear 34a of compound gear 34, and 48 teeth on each of the drive gear 31 and the large gear 34b of compound gear 34, have produced good results. Assuming a normal projection speed of 16 frames/second, the projector advances film at 5⅓ frames/second when shifted to slow speed using a step down ratio 3:1. Of course, the main shaft speed may be varied if a variable speed motor is used in the projector, and the slow speed will be ⅓ of the new shaft speed.

A partially different film advancing mechanism embodying the invention is shown in FIGS 11 and 12. As illustrated, a shaft 129 supports a freely rotating assembly 100 which includes a shutter 124 and constant diameter cam 125 both fixed on a cylindrical sleeve 101, which is in turn fixed on a central sleeve 102. An exposed end of the sleeve 101 is formed as a spur gear 103. A floater gear 131 also freely rotates on the shaft 129 immediately adjacent the gear 103, with a cam 126 being fixed on the shaft on the other side of the gear 131. The cam 125 is disposed in the recess of shuttle plate 122, in the same way as was the cam 25 in the plate 22, and moves the plate and an arm 121 and film moving finger 120. Also, the shuttle plate carries a pin 144 that is held against the cam 126 by a spring 141 and registers periodically with an arcuate recess 126a in the radial cam surface. The end of the shaft 129 is provided with a central cylindrical bore 104 as well as an axially elongated slot 105 which extends through the shaft wall to the bore 104. Slidably disposed in the bore 104 is a shifter pin 106 carrying a radially projecting pin 107 that extends through the slot 105 and is received in either a radial slot 109 in the sleeve 102 or a radial slot 110 in the gear 131 depending on the axial position of the shifter pin 106.

The assembly 100 is rotated by a motor driven roller (not illustrated) in contact with the periphery of the shutter 124. Floater gear 131 is rotated by one gear 134a of a compound idler gear 134 which rotates on a counter shaft 112 (see FIGURE 12) positioned parallel and adjacent to shaft 129 by a partially illustrated support 114. The other gear 134b of the compound gear engages the gear 103 formed on sleeve 101 causing both gears 134a and 134b to turn when the assembly 100 turns. The relation between the gears 103, 134a, 134b, and 131 is such that the gear 131 is driven at an appropriate fraction of the rate of rotation of the assembly 100.

When the shifter pin 106 is in the forward position illustrated in FIGURE 11, where it is normally held by a compression spring 111 in the end of bore 104, the shaft 129 is caused to rotate at the same rate of rotation as the assembly 100 by the engagement of the projecting pin 107 in the slots 109 and 105. By shifting the pin 106 into its second position in the bore 104 by means (not illustrated) connected to a control on the exterior of the projector, the pin 107 is engaged in the slot 110 in the gear 131 to rotate, at the speed of the gear 131, the shaft 129, cam 126, and a worm 128 fixed to the shaft and driving the sprockets 12. Assembly 100 and cam 125 continue to rotate at their original, faster speed. Thus, the rate of frame advancement is changed by shifting the pin 106, but the length of time each frame of film moves and the angular speed of the shutter remain constant.

It will be noted that those structural features of the two film advancing mechanisms described that permit the projection of film at very low frame/second rates are very simple, reliable, and give a durable mechanism. The added capability of very slow projection speed is achieved inexpensively. In addition, it will be seen that the design permits projection of film when the projector is run in reverse. For example, when the shaft 29 of the first mechanism turns in reverse rotation, the time period during which pin 44 contacts cam surface section 26a causing the finger 20 to be engaged in the sprocket holes, overlaps the time period during which camming surface section 25c rides against plate 37a just as it did in forward rotation of the shaft. In reverse rotation, however, section 25c of the cam 25 lifts shuttle plate 22 up during this period rather than permitting it to move down.

The invention is applicable to motion picture cameras to provide a mechanism for advancing film through the camera in an intermittent movement which may be varied to lengthen the stop time period while not lengthening the film movement time period. Motion picture cameras having this feature might be used to take a sequence of still pictures, as well as to produce motion pictures in situations where there is little movement and/or there are exposure problems or reasons of economy for taking fewer frames/second. The structure of the camera is similar to the described projector in that the movement of the film engaging finger into and out of the film sprocket holes is controlled by means partially separate from the means controlling the finger's film advancing movement.

I claim:
1. A motion picture projector permitting slow motion viewing of film exposed for projection at normal motion having in combination a motor, film advancing means including a film engaging finger attached to a shuttle member, first and second cams engaging the shuttle member for camming movement of the shuttle member and the attached finger, first motor driven means connected to the first cam for reciprocating the finger at a uniform rate along the direction of film movement, second motor driven means, and shifting means alternately connecting the first and second motor driven means to the second cam for shuttling the finger in a direction normal to the film for engaging the film during the forward reciprocation of the finger to advance film, the first motor driven means shuttling the finger at said uniform rate, and the second motor driven means shuttling the finger at 1/nth said uniform rate to engage the film on only some cycles in a regular pattern during the forward reciprocation of the finger to advance film at slow motion, $n$ being an integer.

2. A motion picture projector permitting slow motion viewing of film exposed for projection at normal motion having in combination a motor, film advancing means including a film engaging finger attached to a shuttle member, first and second cams engaging the shuttle member for camming movement of the shuttle member and the attached finger, first motor driven means connected to the first cam for reciprocating the finger at a uniform rate along the direction of film movement, second motor driven means, shifting means alternately connecting the first and second motor driven means to the second cam for shuttling the finger in a direction normal to the film for engaging the film during the forward reciprocation of the finger to advance film, the first motor driven means shuttling the finger at said uniform rate, and the second motor driven means shuttling the finger at 1/nth said uniform rate to engage the film on only some cycles in a regular pattern during the forward reciprocation of the finger to advance film at slow motion, $n$ being an integer, and shutter means rotating at said uniform rate to blank the projection during advancement of the film.

3. A motion picture projector permitting slow motion viewing of film exposed for projection at normal motion having in combination a motor, film advancing means including a film engaging finger attached to a shuttle member, first and second coaxial motor driven rotatable means, first and second rotatable cams mounted coaxially to the motor driven rotatable means and engaging the shuttle member for camming movement of the shuttle member and the attached finger, the first cam being mounted on and fixed to the first motor driven rotatable means for reciprocating the finger at a uniform rate along the direction of film movement, and shifting means alternately connecting the second cam to the first and second motor driven rotatable means for shuttling the finger in a direction normal to the film for engaging the film during the forward reciprocation of the finger to advance film, the first motor driven rotatable means shuttling the finger at said uniform rate, and the second motor driven rotatable means shuttling the finger at 1/nth said uniform rate to engage the film on only some cycles in a regular pattern during the forward reciprocation of the finger to advance film at slow motion, $n$ being an integer.

4. The motion picture projector of claim 3 in which the shuttle member is transverse to the coincident axes of the motor driven rotatable means and cams and the shuttle member is spring biased against the radial surface of one cam and rides on the peripheral surface of the other cam.

References Cited by the Examiner

UNITED STATES PATENTS

| | | | |
|---|---|---|---|
| 2,390,389 | 12/1945 | Redler | 352—180 |
| 3,168,743 | 2/1965 | Nesson | 352—180 |

JULIA E. COINER, *Primary Examiner.*